April 15, 1947.  D. ALPERT  2,419,049
METAL SUPPORTED GLASS WINDOW
Filed March 29, 1943
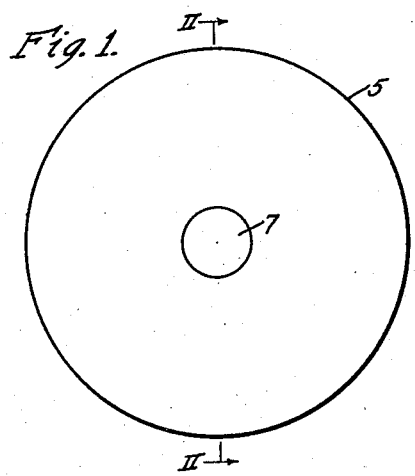  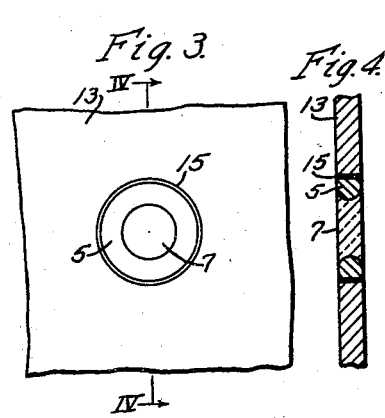 
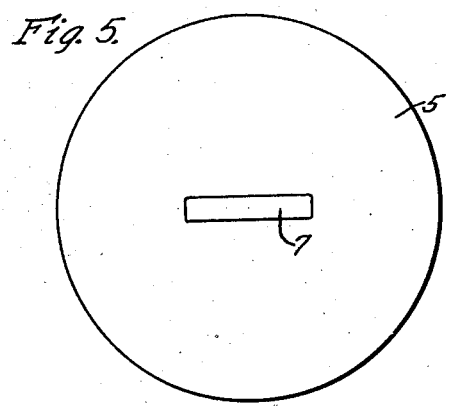 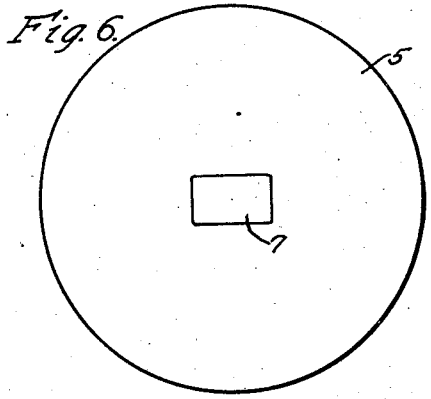
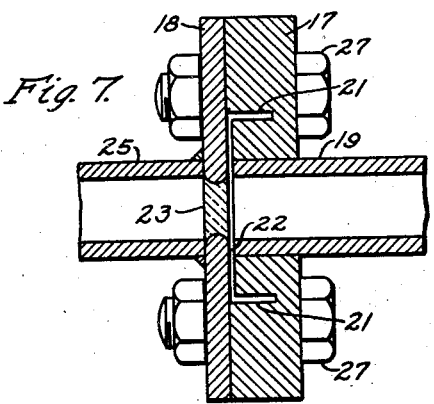 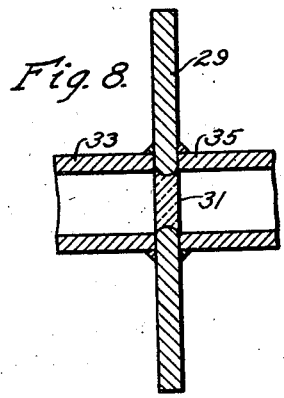
WITNESSES:
Leon M. Garman
John P. Shipman
INVENTOR
Daniel Alpert.
BY
F. N. Lyle.
ATTORNEY Patented Apr. 15, 1947

2,419,049

UNITED STATES PATENT OFFICE 2,419,049

METAL SUPPORTED GLASS WINDOW

Daniel Alpert, Pittsburgh, Pa., assignor to Westinghouse Electric Corporation, East Pittsburgh, Pa., a corporation of Pennsylvania Application March 29, 1943, Serial No. 480,990

3 Claims. (Cl. 189—36.5)

This invention relates to a metal supported glass window, and particularly to a metal supported glass window for use in forming a vacuum-tight seal.

In electrical systems involving the transmission of ultra high-frequency power through hollow wave-guides, it is frequently necessary to maintain different parts of the system at different pressures. For example, it is sometimes necessary that one end of a wave-guide be connected to a high vacuum tube while the other end opens into the antenna system at atmospheric pressure. To enable different parts of the system to be maintained at different pressures, there must be a vacuum-tight seal between these parts. The seal, in addition to being vacuum tight, must be mechanically strong and electrically efficient. The seal must not interfere unduly with the transmission of the power. In most cases, it must not distort the ultra high-frequency waves to any great extent, and power loss must be kept at a minimum.

Since glass passes ultra high-frequency power and is readily workable, attempts have been made to insert a glass window between the different parts of the system which are to be maintained at different pressures. In one previously proposed arrangement, a glass window is formed across the interior of a hollow wave-guide. However, there are a number of difficulties involved in such an arrangement. Hollow wave-guides and other apparatus for conducting ultra high-frequency power must have highly conductive interior walls and are nearly always formed of copper. If a glass window is to be placed within a copper wave-guide, there must be a vacuum tight seal between the glass and metal. Therefore, some arrangement must be made for relieving the strains on the glass due to the difference in the coefficient of expansion of the glass and the copper. A glass seal formed in a hollow wave guide under presently known methods is rather thick and, as a result, the losses are high. Moreover, the glass cannot be made of uniform thickness so that the ultra high-frequency waves passing therethrough are somewhat distorted. In addition, the glass seal within the wave guide does not have the necessary strength to withstand soldering and welding operations adjacent thereto which may be necessary to complete the system.

Because of the many difficulties in providing a suitable glass seal in the transmission system, the general practice in the art involves completely closing off one part of the system from the other by metal walls. In such an arrangement there is no direct transmission of power from the one part to the other but transfer of the power is accomplished by means of coupling loops. However, this arrangement is not entirely satisfactory, because of the necessity of providing impedance matching and tuning sections as well as the coupling loops. In addition such loops are difficult to manufacture and assemble in the system.

It is accordingly an object of my invention to provide a novel window which may be employed in forming a vacuum-tight seal while permitting the passage therethrough of electromagnetic radiation of an ultra-high frequency.

A further object of my invention is to provide a new metal supported glass window which may be employed in forming a vacuum-tight seal.

Another object of my invention is to provide a novel metal supported glass window which may be employed in forming a vacuum-tight seal and in which the glass is of uniform thickness.

A still further object of my invention is to provide a new and improved metal supported glass window for use in forming a vacuum-tight seal which is very strong mechanically.

Another object of my invention is to provide a novel method of making a metal supported glass window which may be employed in forming a vacuum-tight seal.

In accordance with my invention, I provide a metal plate having an opening therethrough and a glass member filling the opening with a vacuum-tight glass-to-metal seal at the edges of the opening between the glass member and the plate. The glass member may be of substantially uniform thickness and each surface thereof is preferably in the same plane as the corresponding surface of the plate. The glass member must, of course, have substantially the same coefficient of expansion over the range of temperatures to be encountered as the metal plate. For this reason, I prefer to form the metal plate of an alloy which consists chiefly of iron, nickel and cobalt as described in detail in Patent 2.217,421, issued to Howard Scott on October 8, 1940. With the alloy plate, I prefer to use a boro-silicate glass of substantially the same coefficient of expansion, such as "Westinghouse 704" glass. The opening may be of any desired configuration, but a circular opening is preferred because of the ease of manufacture, the high mechanical strength, and the simplicity of calculations with respect thereto when the article is to be used in ultra high-frequency work.

In making the metal supported glass window,

I first provide an opening of the desired configuration in the metal plate. The edges of the metal at the opening are then rounded and oxidized. In some cases the edges need not be rounded to obtain satisfactory results. A piece of glass which preferably has a similar configuration as, but which is slightly larger than, the opening in the plate, is pressed into the opening while the glass is maintained at such a temperature that it is soft, and the edges of the metal plate at the opening are maintained at a temperature such that the oxide partially dissolves in the glass and the glass adheres to the metal. In this manner, a vacuum-tight glass-to-metal seal is formed at the edges of the opening.

While the glass in the opening is still soft, molten glass is added or subtracted therefrom until the glass in the opening has a substantially uniform thickness of the same order as the thickness of the plate. This may be accomplished by use of an auxiliary piece of glass. To add glass to that within the opening, the auxiliary piece of glass is heated until it is quite soft. The soft end of the auxiliary piece of glass is then allowed to fuse with the soft glass within the opening and that end remains therewith when the rest of the auxiliary glass is removed. To subtract glass from that within the opening, the auxiliary piece, while still cold, is placed against the soft glass within the opening. A portion of the glass within the opening then adheres to the auxiliary piece and may be removed thereby. By this method, the glass within the opening may be formed with a uniform thickness of ±10%. By turning the plate while the glass is soft to make use of the effect of gravity, the surfaces of the glass may be positioned in substantially the same planes as the corresponding surfaces of the plate if desired. Thereafter the plate and glass are permitted to cool. If a closer degree of uniformity is desired in the thickness of the glass, it may be obtained by grinding the glass after the plate and glass have cooled.

The metal supported glass window manufactured in the preferred manner described above has a number of advantageous features. As a seal is formed simultaneously at all edges of the opening with the same heat, an exceptionally good vacuum-tight glass-to-metal seal is provided. In addition the glass within the opening may be made comparatively thin with a substantially uniform thickness. For this reason, the metal supported glass window is particularly advantageous in ultra high-frequency systems for it permits power to pass therethrough with but very little loss and very little distortion or interference with the electromagnetic waves.

I have found that the metal supported glass window is also extremely strong mechanically. Not only may the glass be ground after the seal is formed, but the plate may also be machined. For example, holes may be drilled in the plate or the plate may be machined in a lathe without breaking the glass or destroying the vacuum-tight seal. I have also discovered that the plate may be soft soldered to other apparatus at any point up to the edge of the glass, and that it may be hard soldered or spot welded to other apparatus as close as one-sixteenth of an inch from the edge of the glass. Consequently, the plate may be conveniently secured to the end of a wave-guide to form a vacuum-tight seal through which power may be transmitted. Moreover, it is well known that the presence of a solid dielectric, such as glass, within a conducting body effectively enlarges the interior of that body as far as the transmission of ultra high-frequency power is concerned. Since the glass is within the opening in the metal plate, it effectively enlarges that opening. Therefore, if the plate is secured on the end of a section of the wave-guide, the opening may be of such size that there is very little interference with the transmission of power.

In making the metal supported glass window, I prefer to press into the opening in the plate a piece of glass having a similar configuration as, but which is slightly larger than, the opening. However, it is not necessary to use a piece having a similar configuration. Moreover, a piece of glass smaller than the opening may be employed although the glass-metal seal is not as uniform as in the preferred method. If a smaller piece of glass is employed, the opening is filled one section at a time. After the entire opening is filled with glass, the thickness of the window may be adjusted in the manner described in the preferred method.

If the glass having the proper coefficient of expansion for the supporting metal to be used has certain characteristics which are undesirable in the particular application of the window anticipated, a different glass may be employed to form the major portion of the window. For instance, "Westinghouse 704" glass, while having the proper coefficient of expansion for use with the preferred alloy, causes a somewhat greater loss in the passage of ultra-high frequency power therethrough than "Westinghouse 707" glass which does not have the proper coefficient of expansion. For applications in which the additional losses caused by the 704 glass are highly undesirable, I provide a metal supported glass window in which "Westinghouse 704" glass is placed at the edges of the opening, forming a vacuum tight glass-to-metal seal, and "Westinghouse 707" glass is in the central portion of the window and fused to the 704 glass at the edges. One method of making such a window is to follow the steps of the preferred method of making a window having but one type of glass while employing 704 glass until a seal is formed. Then glass is subtracted from the center of the window until only a rim of 704 glass remains. Thereafter 707 glass is added in the center in the usual manner (its edges being fused with the 704 glass rim. Because the glass to metal seal is strong and the joining point of 707 and 704 glass is strong, the strains in the glass set up by the difference in expansion of the 707 glass and the metal do not break the seal. Although the arrangement just described refers to 704 and 707 glass, these are merely illustrations and others may be employed if the necessary conditions are met.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is an elevation view of a metal supported glass window in accordance with my invention;

Fig. 2 is a sectional view taken along line II—II of Fig. 1;

Fig. 3 shows a modified structure embodying my invention;

Fig. 4 is a sectional view taken along line IV—IV of Fig. 3;

Figs. 5 and 6 show other modifications of my invention; and

Figs. 7 and 8 illustrate my invention as applied in an ultra high-frequency system.

As shown in Figs. 1 and 2, a metal plate 5 or disc has a circular opening therethrough which is filled with glass 7. The edge of the metal at the opening is rounded as shown at 9, and a vacuum-tight seal between the glass 7 and metal 5 is present at the edge of the opening. The metal plate 5 may be large or small, but it is preferably rather thin, of the order of .010 to .020 inch when it is to be used in an ultra high-frequency system. To insure uniformity, the glass 7 is made of substantially the same thickness as the metal plate 5 with each surface of the glass in substantially the same plane as the corresponding surface of the plate.

In Figs. 3 and 4, the metal plate 5 is shown as a narrow ring. The ring 5 is mounted within an opening in a second larger plate 13 and is secured therein by soft solder 15. Thus, it is possible to have the larger plate 13 of a different material than the ring, and the soft solder takes care of the difference in expansion of the two materials. Since it may be desired to use a metal supported glass window in a number of different applications, the window may be manufactured conveniently in quantity using the narrow ring as shown in Fig. 3 and then that ring may be secured to another larger piece of any desired shape and material.

Fig. 5 shows a modification of the metal supported window in which the window has a narrow substantially rectangular configuration which is particularly useful to polarize electromagnetic waves in a hollow guide.

Fig. 6 shows a window with a different shaped opening. Both of the modified structures of Figs. 5 and 6 are manufactured in essentially the same manner as the structures shown in Figs. 1 and 2.

In systems involving the transmission of ultra high-frequency power through hollow wave-guides, a number of difficulties have arisen in joining two sections of a wave-guide or in joining various components of the system to a section of the wave-guide. To avoid the losses involved in a mechanical joint and the trouble involved in permanent electrical joints, choke-type joints are in general use which allow an excellent electrical joint without a correspondingly perfect mechanical joint.

The metal supported glass window described in connection with Figs. 1 through 6 may be advantageously employed in a choke-type joint as shown in Fig. 7. The choke comprises two members 17 and 18, one of which, 17, is mounted on the end of one section 19 of a wave-guide of circular cross-section while the other is mounted on the end of a second section 25 of the wave-guide. The first member 17 is a relatively thick disc having an inner surface adjacent to the second member 18. There is a central opening in the disc 17 through which the end of the first wave-guide section 19 extends, the disc 17 being soldered on the end of the wave-guide section 19. The disc 17 has an annular slot or groove 21 in its inner surface which is parallel to the axis of the wave-guide 19 at approximately one-quarter wave-length distance from the inner wall thereof, the groove being approximately one-quarter wave length deep. The second member 18 of the choke is a metal plate having a central opening therethrough with a glass member 23 positioned within the opening there being a vacuum-tight glass-to-metal seal at the edge of the opening. The second section 25 of the wave guide is soldered to the plate 18. The inner surface of the disc 17 abuts the inner surface of the plate 18 and bolts 27 extend through the plate and disc outside of the annular slot 21 to increase the rigidity of the connection. The inner surface of the disc 17 within the annular slot 21 is machined so that a narrow space 22 exists between it and the adjacent portion of the plate 18.

By virtue of the size and shape of the spaces at the choke type joint, very little power is lost. At the same time, by use of the apparatus shown in Fig. 7, the different parts of the ultra high-frequency system may be conveniently maintained at different pressures. The metal supported glass window formed by plate 18 and member 23 not only enables a vacuum-tight seal to be made on the end of the second wave-guide section 25, but also serves as a part of the choke. The latter function of the metal supported window is possible because the common surface of the plate 18 and the glass 23 permits the fitting thereto of the machined member 17 of the choke without strain on the glass itself.

In Fig. 8, a metal supported window, formed of a metal plate 29 and a glass member 31, is shown inserted between two sections 33 and 35 of a hollow waveguide. The end of each wave guide section is soldered to opposite sides of metal plate 31. Such an arrangement may also be employed to advantage where it is desired to maintain different sections of a wave-guide at different pressures. Obviously other windows such as the one shown in Fig. 5 may be mounted in this manner. The arrangement shown is possible because the wave-guide ends may be soldered to the plate closely adjacent to the glass without breaking the glass or disturbing the seal.

It is true that whenever there is a sharp discontinuity in the dimensions of a wave guide a large reflection of electromagnetic radiation may occur. However, inasmuch as the presence of an insulator, such as glass, within a metal opening enlarges the effective size of the opening with respect to transmission of electromagnetic radiation, the window size in an arrangement as shown in Fig. 8 may be made the same in effect as the wave guide itself although the guide is secured to the metal plate supporting the window. In this manner reflection of radiation is eliminated.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a metal body having a passageway therein, a metal plate having a peripheral shape of substantially the same outline as but sufficiently smaller than that of said passageway to permit said plate to be secured across and substantially centrally within said passageway by soft solder in the space between the periphery of the plate and the walls of the passageway, said plate being so secured and having an opening therethrough, and a glass member filling said opening with a vacuum tight fused seal at the edges of said opening between said member and plate, said member having substantially the same coefficient of expansion as said metal plate and being located substantially within the boundaries formed by the planes of the surfaces of said plate.

2. In combination, a metal body having a passageway therein, a metal plate having a peripheral shape of substantially the same outline as but sufficiently smaller than that of said passageway to permit said plate to be secured across and substantially centrally within said passageway by soft solder in the space between the periphery of the plate and the walls of the passageway, said plate being so secured and having an opening therethrough, and a glass member of substantially uniform thickness filling said opening within a vacuum tight fused seal at the edges of said opening between said member and plate, said member having substantially the same coefficient of expansion as said metal plate and being located substantially within the boundaries formed by the planes of the surfaces of said plate.

3. In combination, a metal body having a passageway therein, a metal plate of substantially uniform thickness of the order of .010 to .020 inch and having a peripheral shape of substantially the same outline as but sufficiently smaller than that of said passageway to permit said plate to be secured across and substantially centrally within said passageway by soft solder in the space between the periphery of the plate and the walls of the passageway, said plate being so secured and having an opening therethrough, and a glass member filling said opening with a vacuum tight fused seal at the edges of said opening between said member and plate, said member having substantially the same coefficient of expansion as said metal plate and being located substantially within the boundaries formed by the planes of the surfaces of said plate.

DANIEL ALPERT.

REFERENCES CITED

The following references are of record in the file of this patent:

UNITED STATES PATENTS

| Number | Name | Date |
| --- | --- | --- |
| 2,075,477 | Smith | Mar. 30, 1937 |
| 2,057,452 | Scott | Oct. 13, 1936 |
| 2,227,511 | Reynolds | Jan. 7, 1941 |
| 2,219,573 | Fraenckel | Oct. 29, 1940 |
| 2,000,845 | Jonas et al. | May 7, 1935 |
| 2,200,023 | Dallenbach | May 7, 1940 |
| 2,282,856 | Engbert | May 12, 1942 |
| 673,009 | Poulson | Apr. 30, 1901 |
| 2,089,541 | Dallenbach | Aug. 10, 1937 |